Jan. 5, 1960 A. H. ISENBERG 2,919,721
PLASTIC END SEAL FOR THERMALLY INSULATED CONDUITS
Filed Oct. 8, 1957
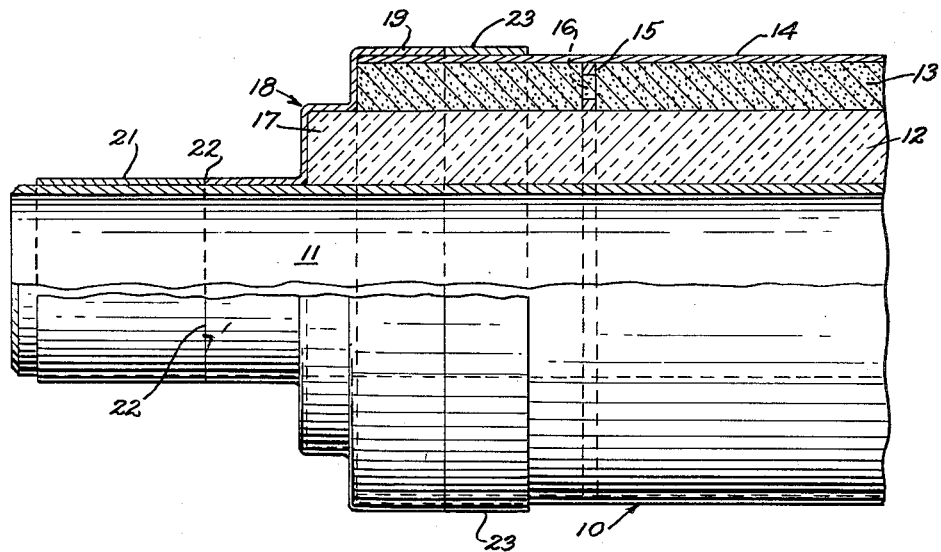
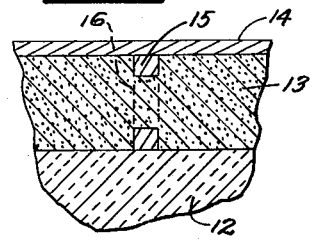
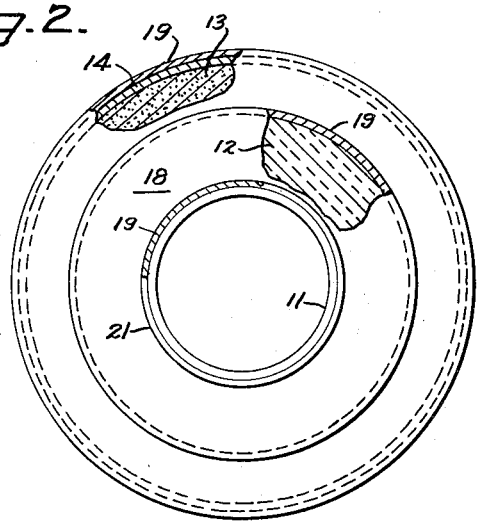
INVENTOR.
ALEXANDER H. ISENBERG
BY
ATTORNEY.

United States Patent Office 2,919,721
Patented Jan. 5, 1960

2,919,721

PLASTIC END SEAL FOR THERMALLY INSULATED CONDUITS

Alexander H. Isenberg, Woodside, Calif.

Application October 8, 1957, Serial No. 688,877

4 Claims. (Cl. 138—64)

This invention relates to plastic removable end seals for waterproofing the exposed end of a thermal insulation body of thermally insulated conduit units.

One type of thermally insulated conduit units for which the invention is particularly adapted comprises an elongated inner conveyor pipe of relatively heavy weight-supporting metal circumferentially enclosed firstly in a body of thermal insulating material which in turn is enclosed in a moisture-impervious layer, and the latter being enclosed in an outer casing, the thermal insulation having an exposed end portion of intermediate length relative to the conveyor pipe and moisture impervious layer.

It is well known to make such conduits in units prefabricated at a point of manufacture and ship them to a place of installation where a series thereof may be laid end-to-end in a conduit system in which suitable field joints are supplied or fabricated at time and place of such installation.

Since the conveyor pipe may expand and contract responsive to temperature variation of conveyed fluid, it is to be understood that there is not a fixed and immovable relationship between the conveyor pipe and the immediately surrounding and enclosing body of insulation, and that, therefore, in the handling, shipment and storage of such units there is liable to be axial longitudinal movement to some extent between the conveyor pipe and the surrounding body of insulation. Further, since the field joint also requires packing with insulation, it is equally desirable that the end portion of the insulation body of the prefabricated unit shall extend beyond the adjacent end of the surrounding moisture impervious layer therearound, and also shall be spaced from the terminal end of the conveyor pipe. Thus, there is an exposed end of the thermal insulation which is subject to damage in transit, handling, installation, and storage, both from physical force and from weather conditions, since it is not infrequent that the units are delivered to a place of installation a long time before the actual installation thereof. This insulation body is usually moisture absorbent porous material without high resistance to physical injury, for which reason it is desirable in storage and shipment to seal it against atmospheric conditions until it is installed and coupled up in a field joint at which time it is permanently sealed in the sealed joint.

It is therefore an object of the invention to provide in such a conduit unit an end closure to protect the stepped exposed end of the insulation body against physical damage and absorption of moisture, and provide in such end closure a degree of flexibility to accommodate a degree of shifting movement between the conveyor pipe and insulation body during storage and shipment, and to provide such an end closure which may be applied and removed with facility.

Briefly described, the invention comprises a moisture impervious end seal for sealing such exposed ends of the thermal insulating body and the adjacent end portions of the conduit unit with a thin membraneous coating film of a sprayable plastic material which may be sprayed as a liquid and sets to form a moisture impervious membrane or film removably bonded in superficial contact with said exposed end parts of the conduit unit, and having a degree of flexibility.

One form in which the invention may be exemplified is described herein and illustrated in the accompanying drawing in which:

Fig. 1 is a side elevational view of the invention partly in section.

Fig. 2 is an end view of Fig. 1 partly in section.

Fig. 3 is an enlarged fragmentary portion of structure shown in Fig. 1.

Referring to the drawing in which like reference characters indicate corresponding parts in the several views, 10 indicates generally an end portion of a thermally insulated conduit comprising an elongated conveyor pipe 11 having a body of thermal insulation 12 therearound such as a body of magnesia, rockwool, glass fiber, asbestos or the like. The layer of thermal insulation is in turn surrounded by a layer of moisture impervious material 13 such as bitumen which is pourable when heated and hardens by congealing in situ at normal temperature. An outer casing 14 is provided surrounding the moisture-impervious layer, a spacer member 15 being interposed circumferentially between the thermal insulation 12 and such outer casing whereby the conveyor pipe and insulation are supported relative to the outer casing and a space is provided into which the moisture impervious bitumen may be poured in heated liquid form and hardened to provide the moisture impervious layer 13, the spacer member 15 being provided with openings 16 therethrough through which the liquefied bitumen may flow. The conveyor pipe preferably has snugly slidable fit within the surrounding body of thermal insulation to accommodate thermal expansion and contraction of the conveyor pipe.

It is to be noted that the outer casing and the bitumen layer are coterminous and that the thermal insulation extends therebeyond but terminates in spaced relation to the end of the conveyor pipe thus providing a stepped end to the composite layers and leaving an end portion 17 of intermediate length of the thermal insulation exposed and unprotected from either weather or physical damage.

Since such an exposed end portion 17 of the insulation is prone to injury by both of such causes, a moisture impervious membraneous film end closure generally indicated 18 is provided for encasing said exposed stepped end portion both at the end face and circumferentially. This membraneous end closure may be of any of the well known types of resins generally referred to as a plastic having the characteristic of being a liquid which may be sprayed in liquid form and hardens in situ upon exposure to atmosphere, and when so hardened is adherent and impervious to moisture and has sufficient flexibility to permit a relatively small degree of longitudinal movement between the conveyor pipe and enclosing body of thermal insulation, as well as a capacity to dent, rather than fracture or break from the normal impacts to which the exposed end of the insulation may be subjected, yet, has a tenacious flexible body quality which permits it to be slit longitudinally with a sharp knife edge through its axial and radial portions and thereupon peeled integrally as a sheet for removal purposes.

It is preferred that the plastic film shall enclose the entire stepped end portion of the conduit unit including the exposed longitudinal end face and the adjacent exposed radial face of the thermal insulation, the adjacent end portion of the outer casing, and the exposed face end of the moisture impervious layer as well as the adjacent circumferential portion of the conveyor pipe, as indicated at 19, both to avoid dampness creeping along the exposed parts and attacking the insulation body due to extended exposure to weather, and also because the film is peeled in a sheet from the end of a conduit unit when a field joint is made to another of such units, such peeling operation being facilitated because the portion of the film adhering to the outer casing and the conveyor pipe peel more readily and provide a reinforcing edge portion which may be manually engaged and bear the tension of stress in peeling the more tenacious bond to the relatively rough and fibrous surfaces of the thermal insulation and the exposed end of the bitumen layer, to which latter the plastic film may become quite tightly attached due to the adhesive quality of the bitumen when freshly poured and especially if the temperature of the weather is relatively warm.

Prior to such spraying operation of applying the film 18, it is preferred to provide a masking member or tape 21 around the extended exposed end portion of the conveyor pipe so as to limit the bonding of the film to a circumferential line 22 which is spaced from the terminal end of the conveyor pipe, since a sharply defined edge is preferable in peeling the film from the conduit unit, and the further reason that in making a weld of abutting ends of successive conveyor pipes in a field joint, the burning of any plastic film by the heat of the welding torch creates offensive fumes and smoke. A similar masking tape member 23 may likewise be applied around the outer casing at the opposite end of the film, but manifestly solely to provide a sharply defined peeling line for the plastic film.

When the field joint is made the exposed end of the conduit unit is then shielded by the packing of the field joint against further possibility of physical or weather damage, the plastic film is preferably removed immediately prior to installation of the field joint. Such removal may be effected by slitting the plastic film longitudinally of the axis of the conduit and radially at the end faces of the insulation and bitumen and peeling it circumferentially as a unitary membraneous sheet, first having preferably removed the masking tapes.

Having described the invention, what is claimed as patentable is:

1. A thermally insulated conduit unit adapted for prefabrication for installation in a conduit system, comprising a conveyor pipe, a body of thermal insulation around said conveyor pipe, an outer enclosing casing around the thermal insulation and spaced therefrom, a moisture impervious body between the thermal insulation and outer casing, the respective terminal ends of the conveyor pipe, thermal insulation and moisture-impervious layer being exposed in stepped relation relatively and in which the exposed end of the thermal insulation is of intermediate length relative to the conveyor pipe and moisture impervious layer, and an integral membraneous peelable film closure member of flexible moisture impervious self-forming plastic enclosing and removably bonded to the relatively adjacent exposed respective longitudinal and radial exposed face portions of the said stepped bodies, said plastic enclosing member being removably bonded to said exposed stepped end portions in moisture-impervious superficial contact, and being extended along the adjacent circumferential faces of the respective outer casing and conveyor pipe.

2. A removable end protecting closure for the exposed end of thermally insulated conduit units, as set forth in claim 1, and in which said membraneous film is of a sprayable plastic material which hardens flexibly upon exposure to atmosphere whereby it may be sprayed on the exposed end of the conduit unit and hardened in situ and peeled therefrom.

3. In a thermally insulated conduit unit having exposed relatively stepped, respective terminal ends of a conveyor pipe, thermal insulation, a moisture impervious layer, and having an outer casing circumferentially therearound, and in which the exposed end of the thermal insulation is of intermediate length relative to respective adjacent ends of the conveyor pipe and moisture impervious layer, the combination therewith of an integral moisture-impervious plastic flexible film closure member enclosing the longitudinal and radial faces of the exposed stepped end portion of the thermal insulation and the adjacent relatively stepped portions of said conveyor pipe and moisture-impervious layer, and the adjacent outer circumferential end portion of the outer casing, said film closure member being circumferentially continuous and removably bonded thereto in moisture-impervious superficial contact, the said film being a sprayable plastic material adapted for hardening flexibly in situ upon exposure to atmosphere whereby it may be peeled as a sheet from the end of the conduit unit.

4. A protecting closure film for an exposed end of a thermally insulated conduit unit, as set forth in claim 3, and in which the plastic film end closure has one terminal end edge spaced from the terminal end of said conveyor pipe, and a strip of masking tape circumferentially of the conveyor pipe abutting the terminal end edge of the plastic film, whereby the removal of said masking tape spaces the terminal end edge of the plastic film from the terminal end of the conveyor pipe.

References Cited in the file of this patent
UNITED STATES PATENTS

| | | |
|---|---|---|
| 2,545,030 | Isenberg et al. | Mar. 3, 1951 |
| 2,765,182 | Williamson | Oct. 2, 1956 |

FOREIGN PATENTS

| | | |
|---|---|---|
| 76,765 | Netherlands | Dec. 15, 1954 |